United States Patent [19]

Gascuel et al.

[11] Patent Number: 4,545,066
[45] Date of Patent: Oct. 1, 1985

[54] METHOD AND DEVICE FOR READING MATRIX PRINTING TEXT

[76] Inventors: Jean-Paul Gascuel, 6 rue du Val-de-Grâce, 75005 Paris; Jacques Rivaillier, 26 rue Mars, 78470 Saint-Remy-les-Chevreuses Cressely, both of France

[21] Appl. No.: 478,580
[22] Filed: Mar. 24, 1983

[30] Foreign Application Priority Data

Apr. 8, 1982 [FR] France .................. 82 06210

[51] Int. Cl.⁴ ............................................ G06K 9/18
[52] U.S. Cl. ........................................ 382/11; 382/67
[58] Field of Search ............... 382/11, 67; 250/568

[56] References Cited

U.S. PATENT DOCUMENTS

| 3,432,673 | 3/1969 | Mader | 382/67 |
| 3,723,969 | 3/1973 | Thaddey | 382/11 |
| 4,263,504 | 4/1981 | Thomas | 235/454 |
| 4,268,179 | 5/1981 | Long et al. | 382/2 |

Primary Examiner—Leo H. Boudreau
Assistant Examiner—Joseph Mancuso
Attorney, Agent, or Firm—Sughrue, Mion, Zinn, Macpeak, and Seas

[57] ABSTRACT

A readhead for reading text printed by a matrix printhead comprises an aligned array of side by side photodiodes (4). An optical system forms an image of a strip of the text support on the array. The image and the photodiode array are such that the image of a single printed dot of a character block normally covers an integer number of photodiodes. The array is periodically sequentially scanned to form an output signal which is digitized before being fed to a margin detector which determines margins above and below the character block. Signal blocks are stored after being analyzed by counting margin values and the number of "1" and "0" states. The process of the invention results in a signal which is effectively a reproduction of the signal originally used to print the character blocks.

7 Claims, 6 Drawing Figures

METHOD AND DEVICE FOR READING MATRIX PRINTING TEXT

BACKGROUND OF THE INVENTION

1. Field of the Invention

The invention relates to a method of reading text printed by a matrix printhead, in which an area of the printed line is electro-optically scanned longitudinally and transversely at respective frequencies which are logically related to one another. A digital signal is generated thereby which reproduces the signal which controlled the printing. The invention also concerns a read-head device for implementing this method.

2. Description of the Prior Art

The most common electromechanical form of matrix printhead is the needle printhead, the operation of which is typical of matrix printing processes.

Needle printheads are currently the fastest electromechanical printing device. They comprise a plurality of adjacent cylindrical needles with their axes aligned transversely to the printing line, the head moving at substantially uniform speed along the line. Printing is produced by advancing certain needles, which press a transfer ribbon against a support sheet. At any time at which needles are advanced, to each needle there corresponds a point location, the combination of which constitutes a character body. Advancing a number of needles causes the printing of the corresponding points, the disposition of which defines the structure of the body. Needles are advanced to print a body in response to a command signal segment comprising a plurality of binary intervals in a sequence which corresponds to the structure of the body. Bodies succeed one another at an axial separation set equal to the location diameter. In alphanumeric printing, each character is formed by a number of adjacent bodies, often a plurality of bodies, the first and last of which are empty to constitute the gaps between characters.

Other types of printing are also possible, however. In particular, there is encoded printing of the kind disclosed in French patent application No. 79 16525 of June 27, 1979, in which each body represents a character in the ASCII code, with additional timing and parity data. This encoded printing in the margin of alphanumeric printing duplicates the clear language text in concentrated form and provides for reading this text in a directly usable form.

Nevertheless, it will be remembered that alphanumeric printing is controlled by a coded signal comprising multiple interval segments, using transcoding matrices such that to a signal segment there corresponds the number of bodies of which the alphanumeric character is composed. Thus the reading of alphanumeric text does not differ significantly from that of encoded text, since body by body scanning of the area occupied by a character produces a signal in one to one relationship with the printing control signal.

The immediately obvious method for reading a text consisting of a succession of character bodies, each body consisting of a plurality of circular point locations with the disposition of printed points corresponding to a determined structure, would seem to consist in consecutively scanning the locations of a body, to identify which locations are occupied by a printed point, and the bodies of the line, and determining the different reflection conditions from printed and empty locations with the scanning resolution being the same as the printing resolution.

While this reading method seems initially attractive by virtue of its simplicity, it is seen to be unusable in that it presupposes that the scanned locations are in strict positional conformity with the corresponding locations during printing. In other words, to use the terminology of printing, it assumes that perfect registration is obtained along and transversely to the line. This can only be achieved if coincidence errors between the printing format and reading format are less than a relatively small fraction of the location diameter at all points on the support. By way of indication, the needle diameter is often of the order of half a millimeter, and the maximum tolerable registration error is 20% of a needle diameter, that is to say 0.1 mm. Since in the A4 format the printing area normally measures 257×170 mm, or approximately 500 locations vertically and 350 locations horizontally, a systematic registration error of 0.2 micrometers per location is sufficient to produce the maximum permissible error at the end of the page, or a random error of 6 micrometers, assuming proportionality of the total error to the square root of the number of events subject to the random error.

Also, there are other sources of error, including the presence of dark spots on the printing medium in a blank area and failure to print part of a printed point. These printing errors result in reduced contrast when the location as a whole in analysed. Also, in the overall analysis of the point, determining the reflectivity produces an analog indication subject to the noise produced by each source of error, with the result that cumulative errors compromise the reliability of the classification between "1" and "0" logic states.

The objective of the invention is to provide a method of reading matrix printed text which accomodates and compensates for registration errors.

Another object of the invention is to provide a reading method which takes separate account of the various printing errors so as to compensate for them separately.

SUMMARY OF THE INVENTION

The invention resides in a method of reading a text printed by a matrix printhead and defining along the length of a line a succession of character bodies each comprising a plurality of circular point locations aligned transversely to the line, the arrangement of the printed points of a body defining a structure, and at least the first printed body of a line having a fixed key structure, in which method an area of line is electro-optically scanned longitudinally and transversely at respective frequencies which are logically related to one another. A signal is then generated which comprises segments consisting of a plurality of intervals corresponding to respective bodies and locations so as to reproduce the signal which originally controlled the printing of the text. The line area is scanned by elementary grains spaced by one step, with the number of steps per location diameter defining a grain factor. Transverse scanning occurs at a clock frequency in one period on a column comprising a multiplicity of grains, the column length exceeding that of an upper and lower registration margin body, and longitudinal scanning occurs at the period timing interval. The signal resulting from such scanning is converted to digital form having "1" and "0" states corresponding respectively to the presence and absence of printing in the corresponding grain, so as to constitute a succession of multiple-state blocks in correspondence with the periods. The number of "1" states in each block is counted, the difference is computed between this number and the corresponding number for the preceding block, the preceding block is stored when this difference becomes negative, the stored block for the key structure bodies is analysed via said key structure so as to store the number of "0" states at the start of the block which constitutes the upper registration margin of the line, and subsequent states of the block are routed in groups the size of said grain factor into a plurality of cells, said routing procedure being continued for subsequent blocks so as to form said signal comprising multiple interval segments from the contents of said cells.

It will be understood that the read scanning frame is finer than the printing frame, the longitudinal and transverse resolutions being respectively multiplied by the grain factor. The analog/digital conversion error is not substantially modified by the fine frame scanning. On the other hand, the counting of the number of "1" states in a block and subtraction of the number counted in the preceding block provides for detecting and storing the block containing the maximum number of "1" states, this block corresponding to substantially axial scanning of the body, independently of the line registration. Also, the determination of the upper registration margin at least for the first stored block in correspondence with the key structure provides for readjusting the registration margin on each line and so eliminates the risk of cumulative error. Finally, the routing of groups of states into cells which each correspond in terms of their size to the grain factor and in terms of their disposition relative to the upper registration margin to one interval of the signal segment provides for determining the nature of the interval resulting from the content of the cell, the interval being "1" if the majority of cell states are "1" and "0" if the majority of cell states are "0".

In order to convert the unprocessed signal resulting from such scanning to digital form, the same is preferably applied to a comparator having a threshold set relative to the maximum amplitude of the unprocessed signals.

An integer grain factor is preferably determined by analysing the stored block for the key structure body via the key structure, and the size of the groups of states routed to the cells is adjusted in consequence. Thus in practice it is possible to partially compensate for variations in body size. The integer grain factor may be computed by dividing the number of "1" states of the block by the number of "1" intervals of the key structure, the quotient being rounded off to the nearest integer.

In a preferred arrangement, in order to form the signal comprising multiple interval segments, "1" states in each cell increment a count and "0" states decrement the count, and an interval corresponding to a printed or non-printed point is generated according to whether the final count is positive or negative.

In another aspect, the invention resides in a device for implementing the aforementioned method in accordance with the invention, the device comprising means adapted to support a text printed in lines by a matrix printhead, a readhead, means adapted to move said readhead over said text in the general direction of the lines, means adapted to move said text one line at a time relative to said readhead, means adapted to control movement of said readhead and said text so as to cause same in conjunction to correspond to those of said matrix printhead, an aligned array of side by side photodiodes, an optical system adapted to form an image of a strip of said text transversely disposed relative to said lines on a multiplicity of said photodiodes, means adapted to illuminate said text in such a way that said strip is illuminated in a substantially uniform manner, means adapted to scan said array sequentially, and clock means adapted to control said array scanning means, the array scanning cycle defining the period of the scanning signal and said readhead being moved in steps equal to the width of said strip and at intervals equal to said period.

Other objects and advantages will appear from the following description of an example of the invention, when considered in connection with the accompanying drawings.

DESCRIPTION OF THE PREFERRED EMBODIMENT

Figure 1:
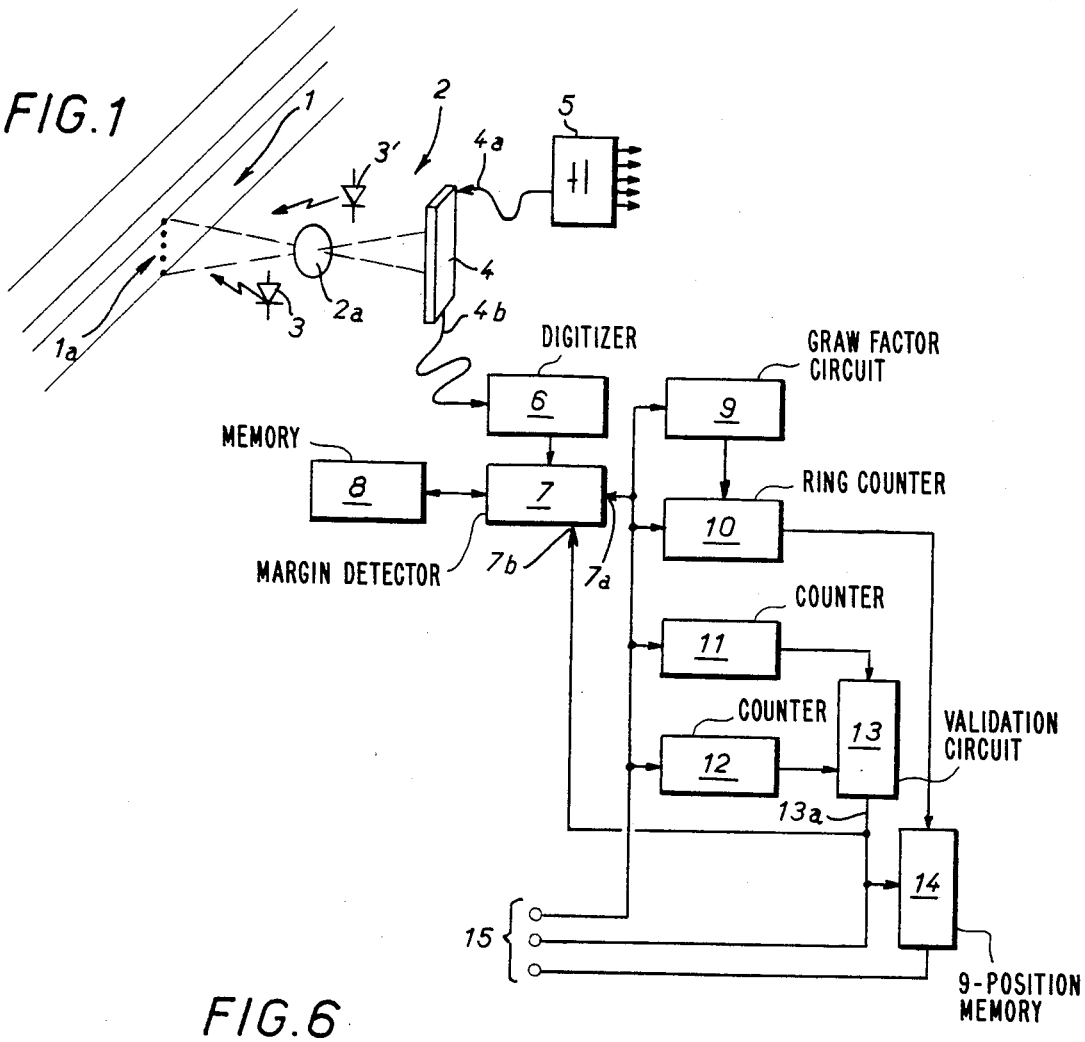
FIG. 1 is a general schematic diagram showing a readhead in accordance with the invention.

In the embodiment selected and shown in FIG. 1, in order to read matrix printing on a support 1, a readhead 2 is caused to move along a line in the direction of arrow 1a. The readhead comprises an objective lens 2a, light-emitting diodes 3 and 3' for illuminating support 1, and an array of photodiodes 4 comprising 64 aligned photodiodes. Objective lens 2a projects the image of an elongate strip transverse to line 1a onto array 4 which is equipped with scannig means such that, at a rate set by pulses from a clock 5 and applied to a clock input 4a of array 4, there appears on output 4b a signal representative of the state of each photodiode, in cyclic succession. This signal is applied to a digitizing stage 6, which will be described in more detail with reference to FIG. 3, such that the signal corresponding to the scanning of a photodiode which receives the image of a printed area is at logic level "1", whereas that which corresponds to the scanning of a photodiode which receives the image of a non-printed area is at logic level "0". The rate of advance of the head along arrow 1a is related to the period of clock 5 in such a way that two successive scans of array 4 correspond to two contiguous strips on support 1. The area whose image covers one photodiode of array 4 is defined as an image "grain".

Figure 2:
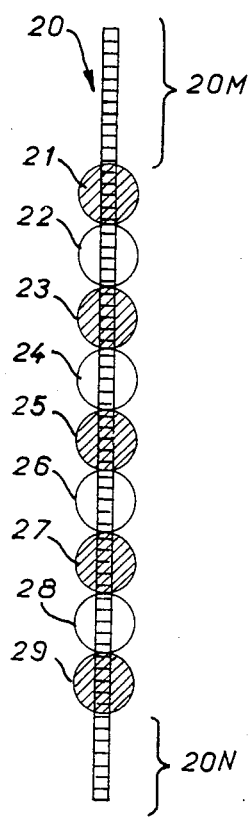
FIG. 2 is a schematic diagram showing the analysis of a body.

Refering to FIG. 2, strip 20 corresponds to a 64-grain scan of a character body with nine locations 21 to 29, its structure being formed by alternating printed points and empty locations, namely five points with odd reference numbers and four empty locations with even reference numbers. The empty locations are shown in circles to facilitate understanding, but in practice these locations are virtual.

The first eleven grains 20M constitute the upper registration margin and the last eight grains 20N constitute the lower registration margin. To each location there correspond five grains: 12–16, 22–26, 32–36, 42–46 and 52-56 for the grains situated on printed areas (points 21, 23, 25, 27, 29); and 17-21, 27-31, 37-41 and 47-51 for the grains situated on non-printed areas. The scanning signal constitutes a block of 64 states, those of rank 1-11, 17-21, 27-31, 37-41, 47-51 and 57-64 being "0" states.

Figure 3:
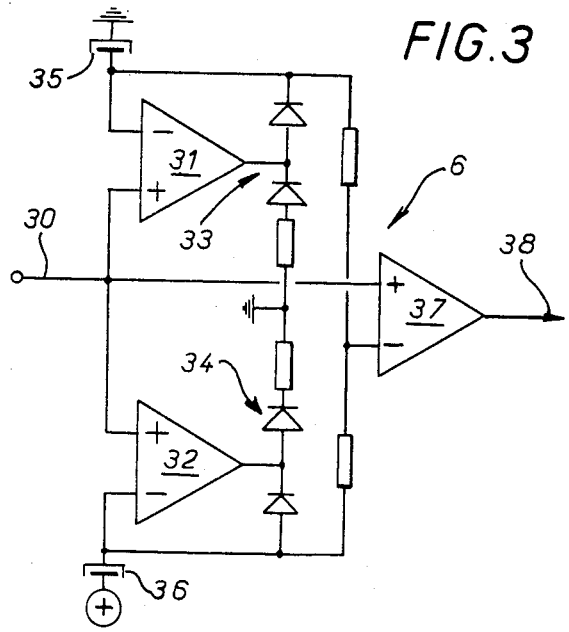
FIG. 3 is a schematic diagram showing a circuit for digitizing scanning signals.

As is seen in FIG. 3, circuit 6 comprises two extreme value detectors each consisting of a differential amplifier 31,32 a two-diode bridge 33,34 and an integrator capacitor 35,36. Capacitor 35 charges to the maximum scanning voltage applied to terminal 30 corresponding to the printed grains, whereas capacitor 36 charges to the minimum voltage corresponding to the empty grains. The scanning voltage is also applied to the direct input of a differential amplifier 37, configured as a threshold comparator, the inverting input of which receives a voltage which is the average of the voltages to which capacitors 35 and 36 are charged. Thus all grains darker than the average brightness are denoted as of state "1" and all grains brighter than the average brightness as of state "0".

Returning to FIG. 1, the signal which is shaped in circuit 6 is analysed to determine the upper registration margin in circuit 7 which is linked to a memory 8. To this end, at the start of the printed line is a key structure body printed in a margin on the side from which reading begins, and which may be the first body of a coded record as described in French patent No. 2 459 725 (application No. 79 16525). The key structure is required to begin with a printed point 21 below the upper registration margin 20M, and is for preference that shown in FIG. 2, expressed as a 9-interval signal 101010101. At the start of a line scan, the blocks received from circuit 6 are retransmitted to outputs 7a of the circuit from the first "1", in particular to drive circuits 11 and 12 which control the sorting of signals. Circuit 11 counts the "1" states for each block received, and computes the difference between the current count and the number counted for the immediately preceding block. When this difference becomes negative, circuit 11 arms the validation circuit 13 which produces a validation signal ("1") on its output 13a. Circuit 7 has counted the "0" states of the block preceding the first "1" state, that is to say the "0" states corresponding to the upper registration margin. The validation signal appearing on input 7b controls the entry into memory 8 of the registration margin value. This value will be recalled on each subsequent scan along the line so as to transmit subsequent blocks to output 7a truncated by the registration margin stored in memory, whether the truncated block begins with a "0" state or a "1" state.

If each coded body begins with a black point (fixed timebase, track 1 at end) the margin may be computed and the corresponding calibration may be effected along the whole length of the line (this is indispensable in the case of sloping or wavy lines).

Circuit 12 carries out counting operations analogous to those of circuit 11; however, it sends a signal to validation circuit 13 where the difference between the number of "1" states of the current block and the number for the immediately preceding block has become positive and greater than three. The signal produced by circuit 12 causes validation circuit 13 to again become responsive to a signal from circuit 11 by sending a validation signal. It will be understood that the increase in terms of the difference between the number of "1" states in two consecutive blocks corresponds to the time at which a new body begins to be scanned, whereas the time at which the difference becomes negative is that at which the scan is centered on the body.

The truncated block arrives at circuits 9 and 10, which respectively determine the grain factor and store the states in cells, each cell comprising a number of consecutive states equal to the grain factor. The grain factor is the number of grains which cover a printed point location. This grain factor is set at five, but may fluctuate between four and six according to printing conditions. When a point is faint the grain factor is less than five; when it is bold the grain factor is higher than five.

Figure 4:
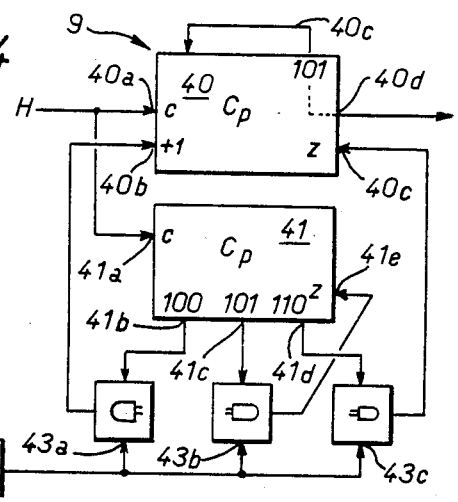
FIG. 4 is a schematic diagram of a circuit for adjusting the grain factor.

As can be seen in FIG. 4, circuit 9 comprises a first counter 40 configured as a cyclic counter with a capacity of five. The end of cycle signal appears on output 40d and this counter receives on its counting input 40a clock pulses resulting from transmission of the block, after truncation of the upper registration margin. A second counter 41 receives the same clock pulses on its counting input. Signals appear on outputs 41c, 41b and 41d of counter 41 when the content of this counter is a multiple of 5, a multiple of 5, −1 and a multiple 5, +1, respectively. Conductor 38 receives the digitized signal and drives a differentiator 42 which produces a pulse when the signal goes from the "0" state to the "1" state or vice versa. Outputs 41b, 41c and 41d of counter 41 are connected to the first inputs of three coincidence detector circuits 43a, 43b and 43c, respectively. The second inputs of these circuits are connected together to the output of circuit 42.

The outputs of coincidence circuits 43a, 43b and 43c are respectively connected to an input 40b of counter 40, which increments the content of the counter by one unit, a reset input 41e of counter 41 and a reset input 40c of counter 40. Thus, if transitions occur for an exact multiple of five clock pulses, signals will appear on output 40d every five pulses, thus marking the point location boundaries. Counter 41 is reset to zero by circuit 43b on each correct transition. If, on the other hand, the transition occurs one clock period too soon, circuit 43a inserts the missing period into counter 40. Also, if the transition is one clock period late, circuit 43c resets counter 40 to zero, thus cancelling the excess period.

Figure 6:
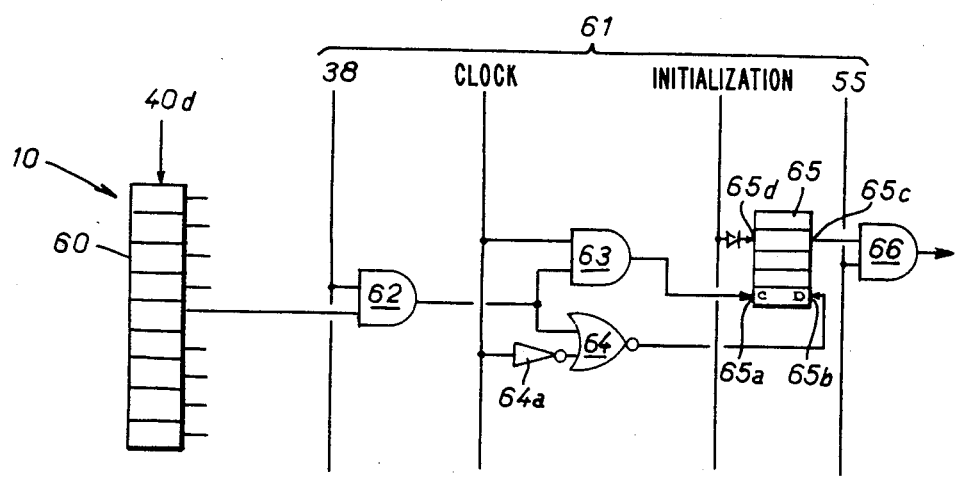
FIG. 6 is a logic diagram showing printed point identification.

As is seen in FIG. 6, circuit 10 for storing the block states in cells comprises a 9-position ring counter which is connected by conductor 40d to the output of cyclic counter 40 (FIG. 4) and which controls the input of nine cells, of which only one cell 61 is shown in full. Cell 61 has at its input an AND gate 62 having one input driven by the corresponding output of ring counter 60 and the other driven by the signal from the shaping stage, on conductor 38 (FIG. 3). At the output of AND gate 62 there appear the states of the block being scanned, corresponding to the activated cell 61. The output signal of gate 62 is applied to one input of an AND gate 63 and to one input of a NOR gate 64. The second input of gate 63 is driven by the clock signals and the second input of NOR gate 64 is driven by the complemented clock signals, which are applied to it through an inverter 64a. The clock signals appear at the output of gate 63 when "1" states are present on line 38 and at the output of gate 64 when "0" states are present on line 38.

A 5-stage binary counter 65 has a counting input 65a driven by the output of AND gate 63 and a downcounting input 65b driven by the output of NOR gate 64. An initialization pulse inserts a 1 into the fourth stage of counter 65, the other stages being at zero; this amounts to loading the counter with the value 8 (1000 in binary). After five clock pulses the next cell is excited. If p "1" states have been counted, the content of the counter at this time is $8+p-(5-p)=2p+3$. If the number of "1" states is three or more, the final content will be nine or more, and the fourth stage will be at state "1"; on the other hand, if the number of "1" states is two or less, the final content will be seven or less, and the fourth stage will be at state "0"; in other words, the state of this fourth stage will be whichever of the cell stages is in the majority. The output of the fourth stage of counter 65 is connected to one input of an AND gate 66, the second input of which receives validation pulses. The output of gate 66 drives one position of 9-position memory 14 (FIG. 1). It will be understood that reading memory 14 provides a 9-interval signal segment, these intervals being "1" or "0" according to whether the device has identified a printed point or an empty location, taking as criterion for the value of the interval whether the majority of the scanning grains for the location correspond to reflection from printing or reflection from the support.

Figure 5:
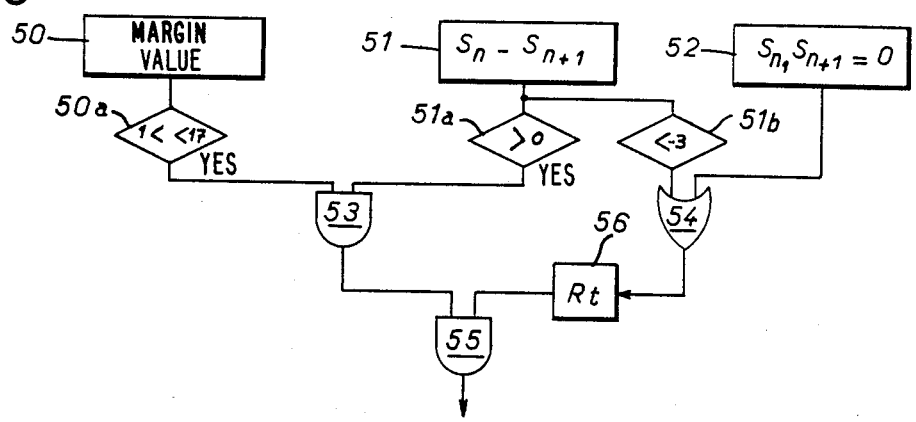
FIG. 5 is a logic diagram showing the validation of a scanning result.

The validation process will now be described in more detail with reference to FIG. 5. At 50 the number of "0" states which constitute the upper registration margin is written; a numerical comparator 50a produces an output signal when the number of states of the margin is between 1 and 17. At 51 the difference between the number of "1" states in the block analysed immediately beforehand and the current block is computed. Two comparators 51a and 51b are responsive to this difference, comparator 51a producing a signal when the difference is positive and comparator 51b doing so when the difference is less than $-3$ (that is to say, negative and greater than 3 in absolute value). The outputs of comparators 50a and 51a are applied conjointly to an AND gate 53, the output of which drives one input of an AND gate 55.

At 52, a memory circuit produces a signal when two consecutive blocks have been null. Conjointly with that of comparator 51b, the output of circuit 52 is applied to an OR gate 54, the output of which drives a delay circuit 56, on the output of which a signal appears, after it has received a signal from OR gate 54. Delay circuit 56 drives the second input of AND gate 55, the output of which constitutes the validation signal.

It will be understood that the validation signal is sent when, with the upper registration margin having a value which ensures that in practice 45 grains cover nine point locations, the number of "1" states of successive blocks has exceeded a maximum (centered scanning), on condition that this number has previously increased in an unambiguous manner, signifying that the scanned body's edge has been unambiguously signalled, or that two successive scans have not produced any "1" states, signifying a blank preceding the body.

It will be realised that, by reading memory 14 (FIG. 1), a signal constituted of 9-interval segments is re-established, each segment representing the structure of a character body and reconstituting the signal applied to the matrix printhead to print the body, in spite of registration errors. It will also be appreciated that each output signal segment is generated in time with the advance of the head, virtually independently of the scanning rate. While it is clear that excessively fast scanning in the direction of arrow 1a (FIG. 1), leaving strips unscanned between two consecutive transverse scans, would entail the risk of faulty reading, the only effect of slowing down or even halting the scanning in the line direction 1a would be redundancy in the data analysed, without consequence in so far as the output signal is concerned.

It will also be understood that the description has been simplified by omitting details relating to circuit structures familiar to those skilled in the art and to data transfer, numerical difference computation and numerical comparison procedures. Also, the description has been deliberately limited to the reconstitution of the printing control signal, as the reconstituted signal may be used in any way, including recording, encoding and copying.

In another connection, it will be noted that the analysis of all state blocks generated from character bodies selected so that each printing position of the matrix printhead is identifiable provides for an evaluation of the quality of the printing produced by the head (point diameter, transverse offset and alignment).

It will be understood that various changes in the details, materials and arrangements of parts, which have been herein described as illustrated in order to explain the nature of the invention, may be made by those skilled in the art within the principle and scope of the invention as expressed in the appended claims.

We claim:

1. A method of reading a text printed by a matrix printhead and defining along the length of a line a succession of character bodies, each comprising a plurality of circular point locations aligned transversely to said line, and wherein at leat a first printed body has a fixed key structure, comprising; electro-optically scanning an area of line longitudinally and transversely at respective frequencies which are logically related to one another, said line area being scanned by elementary grains spaced by one step, the number of steps per location diameter defining a grain factor, said transverse scanning being carried out on a column comprising a multiplicity of grains, said column having a length comprising a body length plus an upper and lower registration margin, and said longitudinal scanning being carried out between adjacent transverse scans, converting the signal resulting from such scanning to digital form having "1" and "0" states corresponding respectively to the presence and absence of printed text in the corresponding grain, to form a succession of multiple-state blocks, counting the number of "1" states in each block, determining the difference between said number and the corresponding number for the preceding block, storing the preceding block when this difference becomes negative, analyzing at least a first stored block via said key structure so as to store the number of "0" states at the start of the block, to thereby determine the upper registration margin of the line, and routing subsequent states of the block, in groups the size of said grain factor into a plurality of cells, and continuing said routing for subsequent blocks so as to generate a signal comprising segments consisting of a plurality of intervals corresponding to respective bodies and locations, to thereby reproduce the signal which originally controlled the printing of the text.

2. A method according to claim 1, wherein said converting step comprises applying said signal resulting from said scanning to a comparator having a threshold set relative to the maximum amplitude of said signal.

3. A method according to claim 1, further comprising defining an integer grain factor, and accordingly adjusting the size of the groups routed to said cells.

4. A method according to claim 3, wherein said step of defining said integer grain factor comprises counting the respective numbers of consecutive "1" states and consecutive "0" states in a block and comparing said count with an integer multiple of a normal grain factor, and inserting or removing a state from streams of said states according to whether the difference from said integer multiple is positive or negative.

5. A method according to claim 1, wherein said step of generating said signal comprising multiple interval segments further comprises forming a count value such that "1" states in each cell increment said count value and "0" states decrement said count value, and generating an interval corresponding to a printed or non-printed point according to whether the final count is positive or negative.

6. A method according to claim 1, further comprising recording a body signal when the difference between the respective numbers of "1" states in a present block and the preceding block ceases to be negative.

7. A device for reading a text printed by a matrix printhead and defining along a length of a line a succession of character bodies, each comprising a plurality of circular point locations aligned transversely to said line, and wherein at least a first printed body of a line has a fixed key structure, said device comprising: means for supporting said text printed in lines; a readhead; means for moving said readhead over said text in the general direction of said lines; means for moving said text one line at a time relative to said readhead; means for controlling movements of said readhead and of said text so as to cause said movements, in conjunction, to correspond to those of said matrix printhead; said readhead comprising an aligned array of photodiodes, an optical system for forming an image of a strip of said text disposed transversely with respect to said lines on a multiplicity of said photodiodes so that the diameter of a printed point corresponds to substantially an integer number of said photodiodes, and means for illuminating said text such that said strip is substantially uniformly illuminated; means for cyclically scanning said array and for generating a corresponding scanning signal; clock means for controlling said array scanning means with the array scanning cycle defining a scanning signal period; said means for controlling movements of said readhead causing movement of said readhead in steps equal to the width of said strip during each period of said scanning signal; means for digitizing said scanning signal to form a signal having two level states, a first of said level states corresponding to a printed area of said strip; means for storing said digitized scanning signal over each period; means for counting said first level states of the stored signal; means for comparing said number of first level states to that of a previously stored signal of a preceding period and for reading said stored signal in response to the equality of said successively counted numbers of first level states; means responsive to said read signal for clipping said read signal in correspondence with an upper margin of said strip and for dividing the clipped read signal into blocks, each block including said integer number of bits; and means for analyzing each of said blocks and for outputting a "1" bit when the number of said first level states is at least half of said integer, and for outputting a "0" bit when the number of said first level states is less than half of said integer, the successive bits of the output signal defining the structure of the character body.

* * * * *